United States Patent [19]
Tsinberg et al.

[11] Patent Number: 5,555,193
[45] Date of Patent: Sep. 10, 1996

[54] VIDEO COMPRESSION SYSTEM WITH EDITING FLAG

[75] Inventors: Mikhail Tsinberg, Riverdale, N.Y.; Faramarz Azadegan, Plainsboro, N.J.; Antony Hu, Baskin Ridge, N.J.; Shigeo Ogawa, Robbinsville, N.J.

[73] Assignee: Kabushiki Kaisha Toshiba, Kanagawa-ken, Japan

[21] Appl. No.: 66,191

[22] Filed: May 25, 1993

[51] Int. Cl.$^6$ ............................................. G02F 1/33
[52] U.S. Cl. ................... 364/514 A; 358/311; 348/426; 348/558
[58] Field of Search ..................... 364/514; 358/335, 358/311, 313; 348/426, 556, 558, 465, 722; 360/33.1, 36.2; 345/112

[56] References Cited

U.S. PATENT DOCUMENTS

| | | | |
|---|---|---|---|
| Re. 34,824 | 1/1995 | Morrison et al. | 348/419 |
| 4,689,672 | 8/1987 | Furukawa et al. | 358/136 |
| 4,821,101 | 4/1989 | Short | 358/181 |
| 4,918,523 | 4/1990 | Simon et al. | 358/133 |
| 4,985,766 | 1/1991 | Morrison et al. | 358/133 |
| 5,023,710 | 6/1991 | Kondo et al. | 358/133 |
| 5,032,905 | 7/1991 | Koga | 358/105 |
| 5,034,816 | 7/1991 | Morita et al. | 358/160 |
| 5,057,916 | 10/1991 | Krause et al. | 358/105 |
| 5,068,724 | 11/1991 | Krause et al. | 358/133 |
| 5,091,782 | 2/1992 | Krause et al. | 358/135 |
| 5,093,720 | 5/1992 | Krause et al. | 358/133 |
| 5,121,205 | 6/1992 | Ng et al. | 358/141 |
| 5,122,875 | 6/1992 | Raychaudhuri et al. | 358/133 |
| 5,134,478 | 7/1992 | Golin | 358/136 |
| 5,138,447 | 8/1992 | Shen et al. | 358/133 |
| 5,150,209 | 9/1992 | Baker et al. | 358/133 |
| 5,150,210 | 9/1992 | Hoshi et al. | 358/135 |
| 5,168,356 | 12/1992 | Acampora et al. | 358/133 |
| 5,181,109 | 1/1993 | Kang et al. | 358/105 |
| 5,182,677 | 1/1993 | Kizu et al. | 360/14.2 |
| 5,191,436 | 3/1993 | Yonemitsu | 358/335 |
| 5,225,904 | 7/1993 | Golin et al. | 358/133 |
| 5,231,384 | 7/1993 | Kuriacose | 358/141 |
| 5,241,382 | 8/1993 | Paik et al. | 358/133 |
| 5,250,933 | 10/1993 | Beaudin et al. | 345/115 |
| 5,260,783 | 11/1993 | Dixit | 358/136 |
| 5,262,854 | 11/1993 | Ng | 358/133 |
| 5,289,276 | 2/1994 | Siracusa et al. | 348/467 |
| 5,339,166 | 8/1994 | LeBrat et al. | 358/311 |
| 5,343,248 | 8/1994 | Fujinami | 348/452 |
| 5,347,318 | 9/1994 | Kobayashi et al. | 348/556 |
| 5,351,131 | 9/1994 | Nishino et al. | 358/335 |
| 5,365,272 | 11/1994 | Siracusa | 348/426 |
| 5,367,341 | 11/1994 | Schnorf | 348/616 |
| 5,377,051 | 12/1994 | Lane et al. | 360/33.1 |
| 5,384,600 | 1/1995 | Kaizaki et al. | 348/556 |
| 5,389,974 | 2/1995 | Bae | 348/555 |
| 5,444,491 | 8/1995 | Lim | 348/441 |
| 5,459,517 | 10/1995 | Kunitake et al. | 348/416 |

OTHER PUBLICATIONS

Azadegan et al., "Data–Placement Procedure For Multi-–Speed Digital VCR", Aug./1994.
"Digicipher® HDTV System Description," Submitted by General Instrument Corporation, Videocipher Divsion, on behalf of The American Television Alliance, Document No. TM 62004, Aug. 22, 1991.

*Primary Examiner*—Ellis B. Ramirez
*Assistant Examiner*—Patrick J. Assouad
*Attorney, Agent, or Firm*—Finnegan, Henderson, Farabow, Garrett & Dunner, L.L.P.

[57] ABSTRACT

A video system that avoids disruption of a displayed scene. A scene from a first data stream is held on a display while a second scene from a second data stream is being built up. A first embodiment includes a transition memory for holding the first scene and a frame memory for building up the second scene. Once the second scene is built up, it is displayed. A second embodiment includes a memory in which the first scene is held and displayed on the display while the second scene is also being built up in the memory.

19 Claims, 4 Drawing Sheets

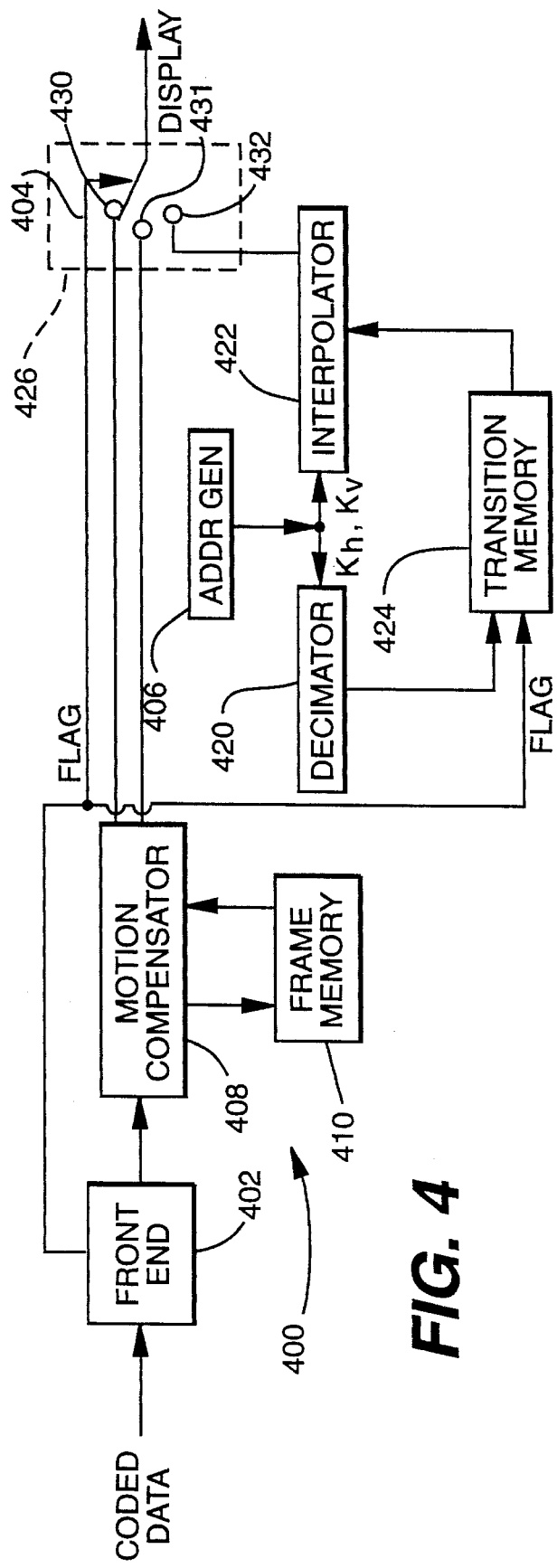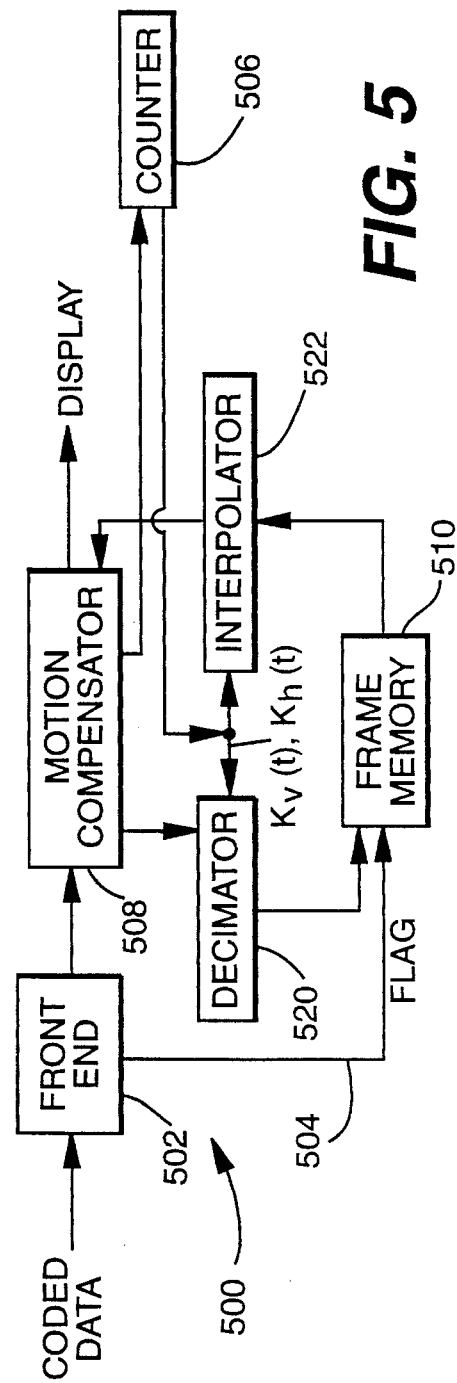

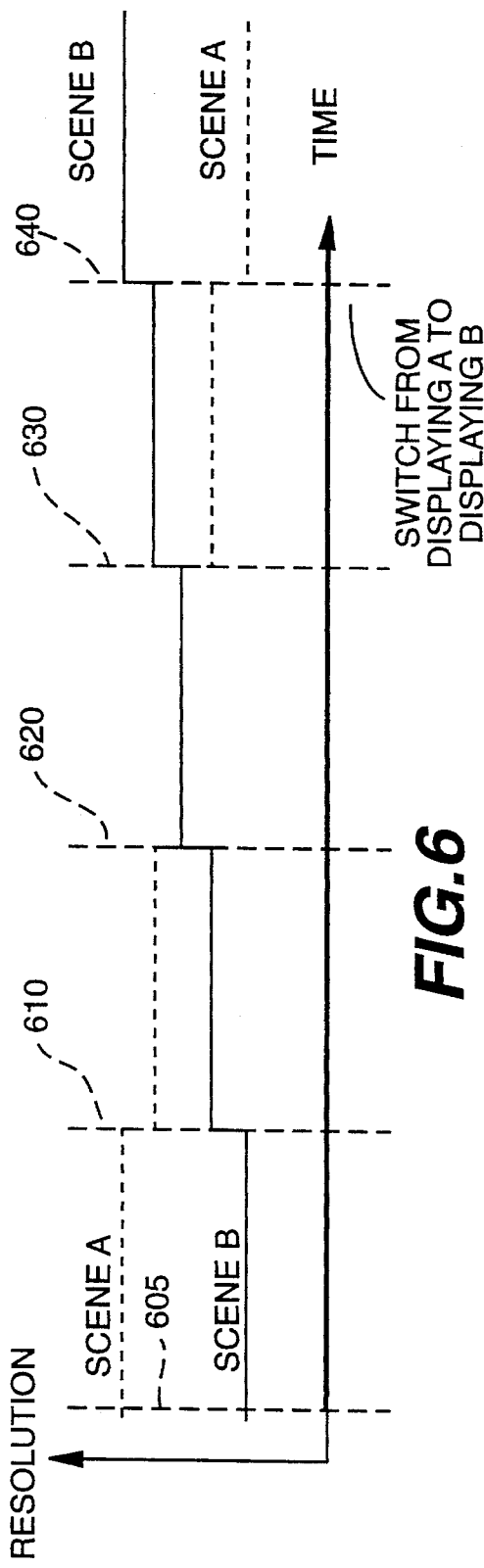
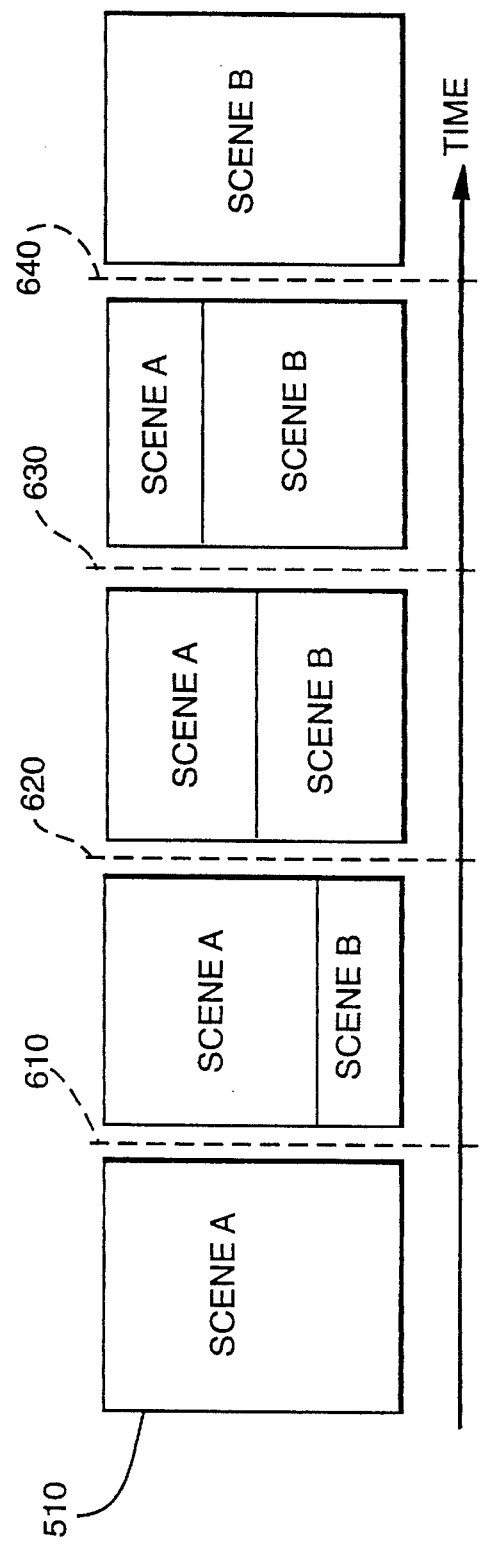

VIDEO COMPRESSION SYSTEM WITH EDITING FLAG

FIELD OF THE INVENTION

The field of the invention relates to video recording and playback systems and methods and, more specifically, to digital video recording and playback systems and methods capable of playing back compressed data originating from more than one source.

BACKGROUND OF THE RELATED ART

Technological advances in various fields allied to video recording have caused many researchers to focus on high resolution and high definition television systems, referred to here as HDTV systems. HDTV systems offer the advantages of extremely high picture quality, significantly larger TV displays, and high quality sound. The movement toward HDTV systems involves a transition from known analog TV systems to digital systems, essentially as has occurred in the audio field in moving from vinyl phonograph records to digital compact disc technology.

Analog TV systems, which include most of the TVs in use today, create the picture or TV image using a varying voltage that controls the position and characteristics of an electron beam. The electron beam is systematically swept across the internal side of the TV screen from left to right and down, much as a person reads English language print on a page. As the electron beam strikes the surface of the TV screen, light is produced which is seen collectively by the viewer as the TV image.

Analog TV technologies are inherently limited in several respects. Probably the most important limitation is the inability to accurately detect and correct errors in the analog signal. The analog TV signal is broadcasted, for example, by a local TV station, as a radio wave with varying voltage. This broadcasted signal can be distorted by environmental or other disturbances prior to reaching the TV receiver. The signal also can be distorted in the TV circuitry. Because there is no reliable reference to detect and correct errors, these errors can produce imperfections or distortions in the resulting TV image.

Another limitation of analog TV systems is the practical limitation on the data rate, i.e., the effective rate at which the TV signal carries data or picture and sound information. Analog TV systems produce the TV image by rapidly projecting a series of still images or image frames, in essentially the same way a movie film is projected with a series of frames to create a moving picture. The analog TV signal is divided into segments or frames corresponding to the projected frames of the TV image. The full frame of the analog signal is necessary to construct the corresponding full TV image frame. It is difficult or impossible to transmit the analog frames in a more compact form, for example, by eliminating redundant information from frame to frame.

Digital TV systems overcome these limitations by using a digital signal that includes numerical data for each picture element or pixel of the TV image frame. The digital signal is segmented into a series of digital frames, with each frame including a series of numbers, ones and zeros, corresponding to the pieces of information in the frame. The word "frame" as used in the remainder of this document refers to a digital frame unless otherwise indicated.

Digital technology offers a number of advantages, some of the most important of which are error detection and correction features. The information in the digital signal also can be processed to reduce or eliminate redundancies from frame to frame of a TV image, and the digital information can be coded (using a single symbol or small group of symbols to represent a larger number or set of numbers) to increase the efficiency of the data transfer and correspondingly to increase the data transfer rate. A processor in the digital TV set can be used to decode the data and use it to project the desired TV image. Techniques for increasing the efficiency of the data and correspondingly decreasing the redundancy are known as data compression techniques.

As a means to achieve desired high data rates, various data compression techniques have been proposed. Compression techniques involving "interframe coding" and "variable length coding" appear to be particularly attractive for digital video applications. Interframe coding involves reducing or eliminating frame-to-frame image redundancies by using motion vectors (numerical data representing motion in the TV image) and residual data (data representing the difference between the TV image constructed using motion vectors and the actual image data obtained from the camera during encoding) instead of fully reproducing the data of each TV image frame. Variable length coding reduces or eliminates frame-to-frame redundancies in the data stream by using variable length digital codes instead of the actual data. With interframe and variable length coding, each digital frame includes two types or pieces of data—intraframe (IA) data and interframe (IR) data. IA data within a given frame is data that is unique to that frame. IR data is data that relates to or links two or more frames, e.g., from one frame to the next. Motion vectors and residual data are examples of IR data. Using these types of techniques in digital TV applications, compression factors of about 30–40 have been reported. With these compression factors, signals, e.g., at 750 megabits per second (Mb/s) can be broadcasted as variable length coded and error protected data streams at data rates of 19–25 Mb/s.

Applying digital technology to VCR equipment, and particularly to VCR equipment that is practical for consumer markets, presents a number of challenges. Most importantly, the cost of the systems must be relatively low for market acceptability.

In addition, TV decoders must be able to receive data streams from one or more sources. Because video compression systems with interframe coding schemes usually encode current frame data in reference to the data in preceding frames, it is necessary that a decoder be able to start decoding interframe data at any point in reference to data of preceding frames. To start decoding these interframe data at any point of a continuous data stream without an existing reference frame, the information required to construct an initial reference frame must be transmitted along with the interframe data. Because construction of an initial frame cannot be done instantly, the display can be very visibly interrupted if concealment techniques are not applied.

OBJECTS OF THE INVENTION

Accordingly, an object of the invention is to provide a concealment technique for a digital video playback system wherein a current scene is held on a display while a next scene from a different data stream is being constructed.

Another object of the invention is to provide a digital video playback system and method capable of receiving frames from two different sources and to provide a clean switch on the display when changing from display of a scene in accordance with the first source to display of a picture in accordance with the second source.

Another object of the invention is to provide a digital video playback system and method capable of receiving frames that are a result of an editing process and to provide a clean switch on the display when displaying the incoming frames.

Another object of the invention is to provide a digital video playback system and method capable of receiving frames from two interlaced data sources and to provide a clean switch on the display when changing from display of a scene in accordance with the first source to display of a scene in accordance with the second source.

Still another object of the invention is to provide a digital video playback system and method capable of receiving frames over two different channels and to provide a clean switch on the display when changing from display of the first channel to display of the second channel.

SUMMARY OF THE INVENTION

To achieve the foregoing objects of the invention, and in accordance with the purposes of the invention as embodied and broadly described in this document, a digital video playback system is provided for a video playback system, comprising: means for receiving a video signal having a first part followed by a second part; means for detecting a flag portion in the received video signal, said flag portion indicating a beginning of the second part; a display for displaying a first video scene in accordance with the first part of the received video signal; and means for holding the displayed first video scene on the display when the detecting means detects the flag portion.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

FIG. 4 shows a first preferred embodiment of the present invention;

FIG. 5 shows a second preferred embodiment of the present invention;

FIG. 6 is a timing diagram illustrating an operation of the second preferred embodiment of FIG. 5; and FIG. 7 shows sequential contents of a memory of the preferred embodiment of FIG. 5 during operation of the second embodiment.

DETAILED DESCRIPTION OF THE PREFERRED EMBODIMENTS AND METHODS

Figure 1:
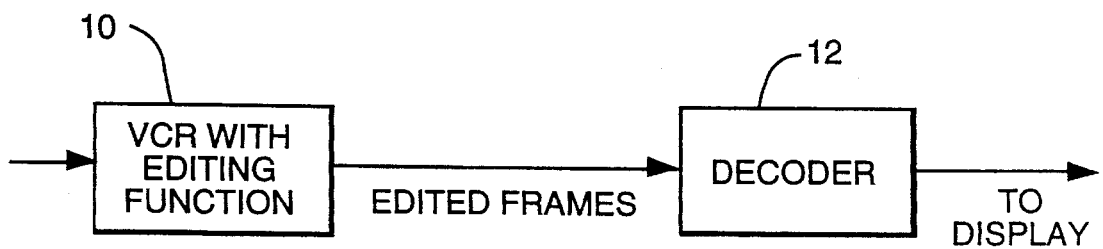
FIG. 1(a) shows a first video system in which the current invention can be employed.
FIG. 1(b) shows a second video system in which the current invention can be employed.
FIG. 1(c) shows a third video system in which the current invention can be employed.
Figure 1:
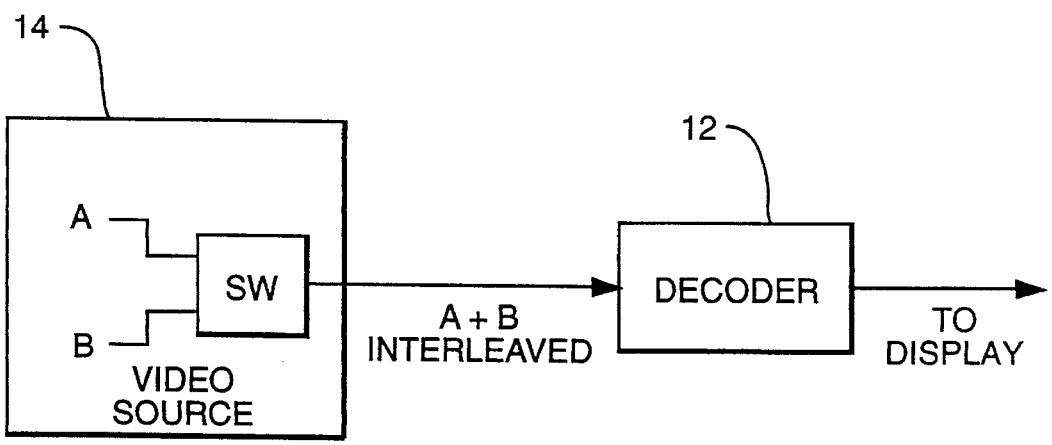
Figure 1:
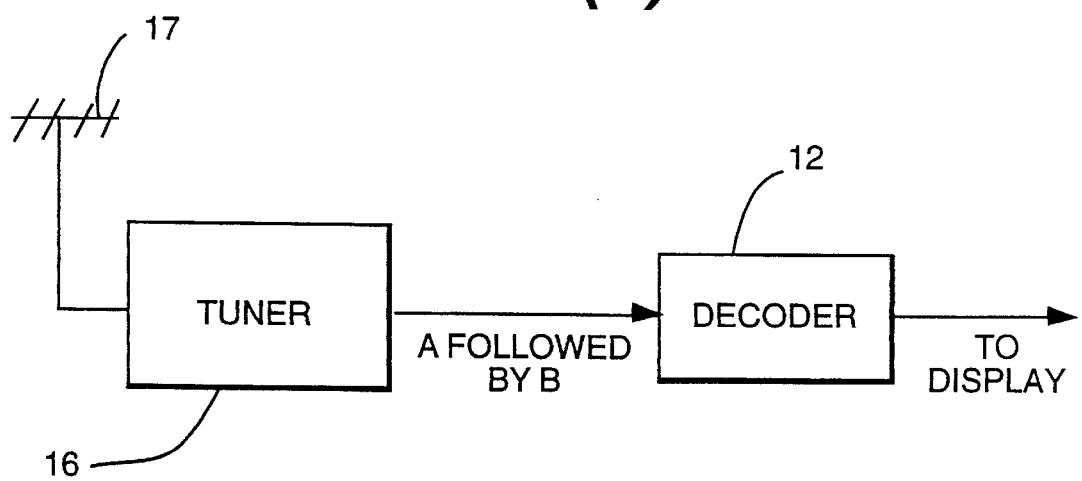

Reference will now be made in detail to the presently preferred embodiments and methods of the invention as illustrated in the accompanying drawings, in which like reference characters designate like or corresponding parts throughout the drawings.

I. Background

The invention and its advantages may be illustrated using several exemplary systems to which the invention may be adapted. FIG. 1(a) shows a first system in which the current invention can be employed. In FIG. 1(a), an editing device 10, such as a VCR, performs editing operations on compressed video data sequentially recorded on a recording medium, such as magnetic tape (not shown). Editing device 10 performs arbitrary editing operations, such as overlaying existing interframe sequences with new interframe sequences or deleting a portion of an existing sequence. In such a case, no reference frame may exist for the edited interframe sequences. The edited output from editing device 10 is input to a decoder 12 of a video playback device, such as a high definition television set.

FIG. 1(b) shows a second system in which the current invention can be employed. In FIG. 1(b) a signal switcher 14 is used to multiplex between several compressed interframe data streams, e.g., streams A and B. Signal switcher 14 thus outputs a data stream to decoder 12 containing interframe data from different sources.

FIG. 1(c) shows a third system in which the current invention can be employed. In FIG. 1(c) a tuner 16 is capable of receiving a plurality of channels through antenna 17. Tuner 16 sends a video bit stream from a current channel to decoder 12. Occasionally, tuner 16 may switch from receiving the current channel A to receiving a new channel B. In this case, tuner 16 will begin to transmit data from the new channel to decoder 12 in place of data from the old channel.

Figure 2:
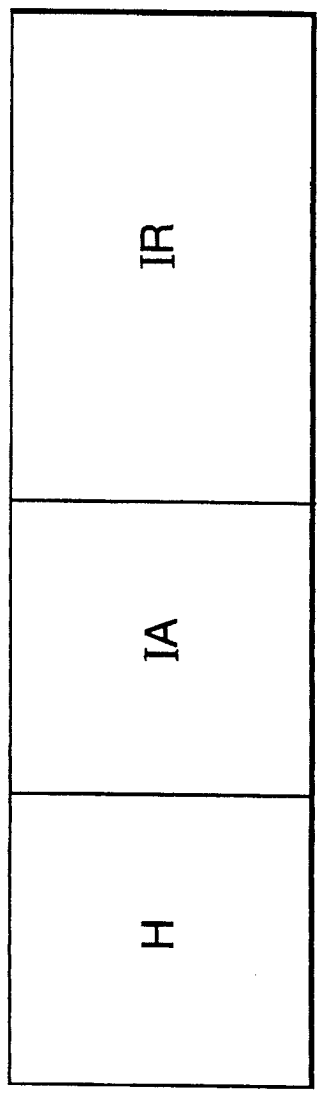
FIG. 2 shows a format for a conventional compressed video frame.

FIG. 2 shows an example format for a compressed video frame of known design. This frame is assumed to have a one second length or duration. Each of the system frames has a fixed length $F_L$, e.g., of 35 megabit (Mb). The sample system frame includes a header portion H, e.g., of 1 Mb. The system frame also includes a first portion of intraframe (IA) data, having a first length $IA_L$, e.g., of 10 Mb. This first portion, which constitutes an IA data allocation or IA segment, includes IA data and excludes IR data. This 10 Mb segment length corresponds to the maximum amount of IA data expected to be present in any of the input signal frames.

The system frame further includes a second portion of interframe (IR) data, having a second fixed length $IR_L$, e.g., of 20 Mb, corresponding to the maximum expected amount of IR data in any of the input signal frames. The second portion, which constitutes an IR data allocation or IR segment, includes IR data and excludes IA data.

Because the IA and IR data of a given input signal frame of one second length almost always have less data than the respective first and second portions of the corresponding system frame, filler data in the form of null data, such as zeros, is added to fill the remainder of the system frames. For example, with reference to FIG. 2, the IA portion of the sample frame has a length of 10 Mb, but the corresponding input signal frame includes only 6 Mb of IA data. Accordingly, 4 Mb of zeros are added as null data $N_1$ to fill the IA portion of the system frame. Similarly, the IR portion of the sample frame has a length of 20 Mb, but the corresponding input signal frame includes only 10 Mb of IR data. Therefore, 10 Mb of zeros are added as null data $N_2$ to fill the IR portion of the system frame.

The length of the system frames will depend on the specific application, and to a certain extent involves a matter of design choice. For example, each recording track may include one system frame, or each recording track may include any positive integer number of system frames.

Various embodiments of the invention may use other formats of video frames. For example, other embodiments may use fixed size frames and/or variable sized frames. Examples of compressed video formats that may be used in the present invention include the Digicipher HDTV format, as described in "Digicipher® HDTV System Description," of General Instrument Corporation, Videocipher Division, 6262 Lusk Blvd, San Diego, Calif. 92121, dated Aug. 22, 1991, Document No. TM 62004, which is herein expressly incorporated by reference.

II. Description of the Preferred Embodiments

Figure 3:
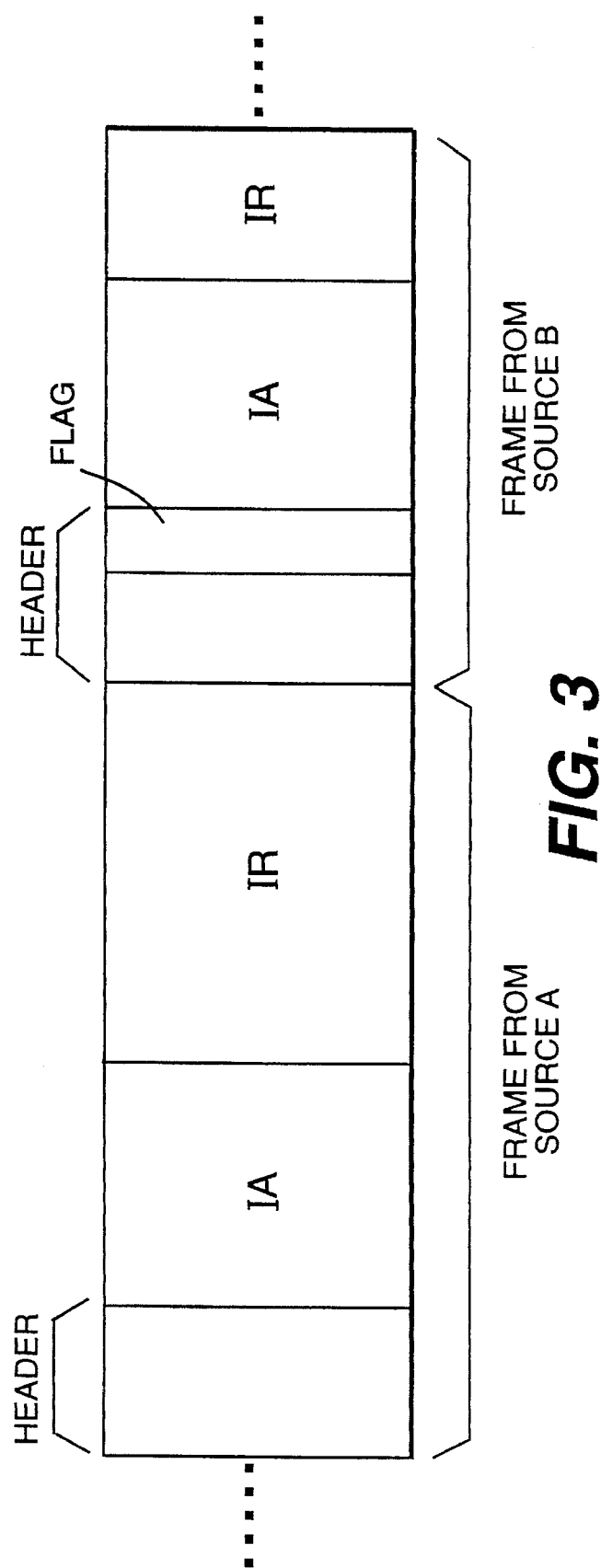
FIG. 3 shows a format for two compressed video frames in accordance with the present invention.

FIG. 3 shows a format for two compressed video frames according to one aspect of the present invention. The format of each frame of FIG. 3 is similar to the format shown in FIG. 2 except that, in FIG. 3, one of the header portions contains a flag portion. This flag portion indicates that the frame containing the flag is a first frame of a plurality of frames that do not rely on data in preceding frames to be constructed (also called "built") by decoder 12.

A flag portion received by decoder 12 indicates a beginning of a transition between data streams. As described below in detail, during the transition, decoder 12 freezes a most recent scene from data stream A while constructing a scene from data stream B. After a first scene from data stream B is completely constructed, this first scene is used as a reference frame and decoder 12 returns to its normal decoding operation.

It should be understood that, while FIG. 3 shows two complete video frames, i.e., a frame from a source A followed by a frame from a source B, in other embodiments of the invention, the frame from source A may be incomplete because it has been interrupted by or overlayed by the frame from source B. Persons of ordinary skill in the art will recognize how to construct frame B so that a beginning of a frame B can be detected before frame A is complete. For example, header B may begin with a unique string of data bits. It should also be understood that an initial frame of data stream A may also contain a flag portion, although such a flag portion is not shown in the figure.

FIG. 4 shows a first preferred embodiment of the present invention. In FIG. 4, a video system decoder 400 includes a front end 402, an address generator 406, a motion compensator 408, a frame memory 410, a decimator 420, an interpolator 422, a transition memory 424, and a switch 426.

In accordance with the invention, the video playback system includes means for receiving a video signal having a first part followed by a second part. Preferably, front end 402 receives output from a video signal source, such as editing device 10 of FIG. 1(a), signal switcher 14 of FIG. 1(b), or tuner 16 of FIG. 1(c). Front end 402 may also receive input from any of a number of sources for a video signal having a first part followed by a second part, where the second part does not depend on the first part to be constructed by the decoder.

Front end 402 performs frame recognition functions and other HDTV decoding functions known to persons of ordinary skill in the art, such as an inverse normalization function and a Discrete Cosine Transform (DCT) function.

In accordance with the invention, the video playback system includes a display for displaying a first video scene in accordance with the first part of the received video signal. In accordance with the preferred embodiment of FIG. 4, the display comprises a video display (not shown) such as a digital TV. Preferably, motion compensator 408 stores the received video signal in frame memory 410, retrieves the retrieved video signal from frame memory 410, and sends the received video signal to a display (not shown). Motion compensator 408 is known to persons of ordinary skill in the art, and uses IA data in successive frames to build new scenes in frame memory 410. Thus, each time movement or change occurs in a scene, motion compensator 408 uses IA data describing the change to build a new scene reflecting the change. Motion compensator 408 receives frames containing IA data such as motion vectors, also called residual data, and uses the motion vectors to change appropriate parts of the current frame in frame memory 410. While frames of the first part of the received video signal are stored in frame memory 410 and displayed on the display by motion compensator 408.

In accordance with the invention, the video playback system includes means for detecting a flag portion in the received video signal, said flag portion indicating a beginning of the second part. In accordance with the preferred embodiment, the detecting means comprises front end 402. Preferably, front end 402 detects flag portion FLAG of FIG. 3 and sends a FLAG signal 404 to switch 426 and transition memory 424.

In accordance with the invention, the video playback system includes means for holding the displayed first video scene on the display when the detecting means detects the flag portion. In accordance with the preferred embodiment of FIG. 4, the holding means comprises switch 426, motion compensator 408, decimator 420, interpolator 422, and transition memory 424. Preferably, when FLAG signal 404 of FIG. 4 is set by motion compensator 408, a current scene of the first part of the received video data is decimated by decimator 420 and stored in transition memory 424. Decimater 420 removes some predetermined portion of the current scene so that the current scene requires less memory than a complete current scene. Interpolator 422 adds data to the current scene stored in transition memory 424 in a manner known to persons of ordinary skill in the art.

Both decimator 420 and interpolator 422 receive predetermined values $K_h$ and $K_v$ from address generator 406 (h=horizontal, v=vertical). The values $K_h$ and $K_v$ indicate an amount that the scene stored into and retrieved from transition memory 424 is to be decimated or interpolated. In the described embodiment, both decimator 420 and interpolator 422 receive the same values $K_h$ and $K_v$. Other embodiments may send different values to decimator 420 and interpolator 422 or may vary the values of $K_h$ and/or $K_v$ with time, e.g., if address generator 406 has a counter.

The following paragraphs describe the operation of the embodiment of FIG. 4. Before the flag portion is detected by front end 402, signal FLAG 404 is not set, and switch 426 selects signal 430 for output to the display. As soon as the flag portion is detected by front end 402, the signal FLAG 404 is set and switch 426 selects signal 431 for output to the display. When signal 431 is selected, the current scene is displayed. During this time, while the current scene from the first portion of received video data is being displayed, the current scene from the first portion of received video data is decimated by decimator 420 and stored into transition memory 424. Some period of time after the flag portion has been detected, e.g., one cycle after the flag portion has been detected, switch 426 selects signal 432 for output to the display and begin display of output from frame memory 424 via interpolator 422.

In accordance with another aspect of the invention, a video playback system is provided. The display playback system includes memory, means for building a second video scene in the memory in accordance with the second part of the received video signal when the detecting means detects the flag portion and means for displaying the second video scene stored in the memory when the second video scene is built. In accordance with the preferred embodiment of FIG. 4, the building means comprises motion compensator 408. The displaying means comprises a video display (not shown) such as a digital TV. Preferably, during a time when switch 426 selects signal 432 for display, a second video scene in accordance with the second part of the received video data is being built up in frame memory 410 by motion compensator 408 in the same way scenes from the first part of the received video data previously were built up. In the described embodiment, approximately eleven frames of the second part of received video data must be received to build up a scene. The details of how the scene is built up in frame memory 410 will not be discussed herein because the current invention can be used with essentially any format of HDTV frames.

Once the second video scene has been built up in frame memory 410, the signal FLAG 404 is cleared and switch 426 again selects signal 430 for display. This causes the first video scene, which has been stored in transition memory 424 and held on the display while the second scene is being built up, to be replaced on the display by the second scene. Thus, the display switches from a first scene from a first video source to a second scene from a second video source with a minimum amount of disruption.

Other embodiments of the invention may include a fade element to slowly fade (decrease the intensity of) the displayed first video scene. Alternately, or in addition, other embodiments may use a fade element to slowly increase an intensity of the second video scene. Thus the first scene may fade out and/or the second scene may fade in.

FIG. 5 shows a second preferred embodiment of the present invention. A front end 502, a counter 506, a decimator 520, and an interpolator 522 of FIG. 5 are similar to corresponding elements of FIG. 4 and will not be described in detail. The second embodiment includes a frame memory 510, which is used for storing both the first and second scenes, as described below in connection with FIGS. 6 and 7.

In accordance with the invention, the video playback system includes control means (1) for causing a first video scene in accordance with the first part of the received video data to be built up in the memory before the flag portion is detected by the detecting means, (2) for causing a partial second video scene in accordance with the second part of the received video data to be built up in the memory when the flag portion is detected by the detecting means, (3) for causing the first video scene to be displayed on the display while the second video scene is being built up, and (4) for causing the second video scene to be displayed after the second video scene is built up. Preferably, front end 502, motion compensator 508, decimator 520, and interpolator 522 perform this function as described below.

The operation of the embodiment of FIG. 5 is described below. FIG. 6 is a timing diagram illustrating an operation of the second embodiment. A vertical axis of FIG. 6 indicates resolution of the first and second scenes. In accordance with the invention, the video playback system includes means for detecting a flag portion in the received video signal, said flag portion indicating a beginning of the second part of the received video signal. Preferably, front end 502 performs this function at time 610 of FIG. 6.

In accordance with the invention, the control means further includes means for causing the display to display the first video scene with increasingly less resolution over time and means for causing the second video scene to be built up in the memory with increasingly more resolution over time, thus occupying respectively greater amounts of the memory. In FIGS. 6 and 7, at time 610, front end 502 detects flag portion FLAG in a header having a format of, e.g., FIG. 3. Front end 502 sets a flag signal 504. At this time, a predetermined portion of scene A is decimated by decimator 520 and stored in frame memory 510. Scene A is then interpolated by interpolator 522 and displayed on the display. A first frame of scene B is received and a portion of frame memory 510 is used by motion compensator 508 to build up scene B in a manner known to persons of ordinary skill in the art in a memory (not shown). The partially built up scene B is decimated by decimator 520 and stored in a portion of frame memory 510. Scene B is interpolated by interpolator 522 before it is used by motion compensator 508 as a basis for the next frame of scene B. Frame memory access time should be short enough to allow both interpolator 522 and decimator 520 to access frame memory 510 as needed.

As shown in FIG. 7, successively larger portions of frame memory 510 are used to store the built up scene B, successively smaller portions of frame memory 510 are used to store scene A. Thus, the resolution of scene A held on the display diminishes somewhat before scene B is smoothly displayed at time 640.

In FIG. 5, counter 506 begins counting when front end 502 detects the flag portion in the received video signal. The output of counter 506 is input to decimator 520 and to interpolator 522 to control which portions of frame memory 510 are occupied by scenes A and B, respectively. As signals $K_v(t)$ and $K_h(t)$ from counter 506 become larger, more space in frame memory 510 is occupied by scene B and less space is occupied by scene A. When scene B is completely built up and displayed, counter 506 is set to output a value causing scene B to occupy all of frame memory 510.

While FIGS. 6 and 7 show five successive views of frame memory 510 for ease of explanation, the described embodiment actually receives eleven frames of scene B before scene B is displayed. Other embodiments of the current invention may receive other numbers of frames before scene B is completely built up and displayed. Again the display of scene A may optionally fade into the display of scene B through operation of a fade element (not shown).

The second embodiment, therefore, allows a display to switch from display of a first data stream to display of a second data stream without using a transition memory.

In summary, the current invention allows a smooth transition between a scene displayed in accordance with a first data stream and a scene displayed in accordance with a second data stream, where the second data stream does not depend on information from the first data stream.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A video playback system comprising:
   means for receiving a digital video signal, said digital video signal having a first video signal part and a second video signal part;

means for detecting a flag portion in the received video signal, said flag portion indicating a beginning of the second video signal part;

a display for displaying a first video scene in accordance with the first video signal part and means for holding the displayed first video scene on the display when the detecting means detects the flag portion.

2. A video playback system according to claim 1, further including:

a memory for storing the first video scene; and means for building a second video scene in the memory in accordance with the second video signal part when the detecting means detects the flag portion;

the display including means for displaying the second video scene stored in the memory when the second video scene is built.

3. A video playback system according to claim 1, wherein the holding means includes a memory for storing the first video scene in accordance with the first video signal part.

4. A video playback system according to claim 1, wherein the flag portion is contained in a header portion in the second video signal part.

5. A video playback system according to claim 1, wherein the first video signal part and the second video signal part of the received video signal both include interframe (IR) data and intraframe (IA) data.

6. A video playback system according to claim 1, wherein the holding means includes a decimator.

7. A video playback system according to claim 1, wherein the holding means includes an interpolator.

8. A video playback system comprising:

means for receiving a digital video signal, said digital video signal having a first video signal part followed by a second video signal part;

means for detecting a flag portion in the received video signal, said flag portion indicating a beginning of the second video signal part;

a transition memory for holding a first video scene in accordance with the first video signal part;

a frame memory for holding a second video scene in accordance with the second video signal part when the detecting means detects a flag portion;

a display for displaying a video scene; and switching means for causing the display to display the first video scene while the second video scene is being built up in the frame memory and for causing the display to display the second video scene when the second video scene is built up in the frame memory.

9. A video playback system according to claim 8, further including a decimator connected to the transition memory for removing a portion of the first video scene before the first video scene is stored in the transition memory.

10. A video playback system according to claim 8, further including an interpolator connected to the transition memory for adding data to the first video scene before the first video scene is displayed on the display.

11. A video playback system comprising:

means for receiving a digital video signal, said digital video signal having a first video signal part followed by a second video signal part;

means for detecting a flag portion in the received video signal, said flag portion indicating a beginning of the second video signal part;

a memory;

a display for displaying a video scene; and control means for causing a first video scene in accordance with the first video signal part to be built up in the memory before the flag portion is detected by the detecting means, for causing a partial second video scene in accordance with the second video signal part to be built up in the memory when the flag portion is detected by the detecting means, for causing the first video scene to be displayed on the display while the second video scene is being built up, and for causing the second video scene to be displayed after the second video scene is built up.

12. A video playback system according to claim 11, wherein the control means further includes means for causing the display to display the first video scene with increasingly less resolution over time.

13. A video playback system according to claim 11, wherein the control means further includes means for causing the second video scene to be built up in the memory with increasingly more resolution over time, thus occupying respectively greater amounts of the memory over time.

14. A video system having a video source and a video receiver, the video source comprising:

means for receiving a first digital video signal;

means for receiving a second digital video signal;

means for transmitting a compressed digital video signal to the video receiver, the compressed digital video signal including the first and second video signals in succession; and means for inserting a header at the beginning of the portion of the compressed digital video signal that includes the second video signal, the header including a flag portion indicating a beginning of the second video signal.

15. A video system having a video source and a video receiver, the video source comprising:

tuner means for selecting successive ones of a plurality of digital video signals;

means for transmitting a compressed digital video signal to the video receiver, the compressed digital video signal including a first and second of the plurality of digital video signals; and means for inserting a header at the beginning of the transmitted compressed digital video signal, the header including a flag indicating that a beginning of the second video signal has occurred.

16. A video playback system comprising:

means for receiving a video signal having a first video signal part and a second video signal part, the first and second video signal parts each including interframe (IR) and intraframe (IA) data;

means for detecting a flag portion in the received video signal, said flag portion indicating a beginning of the second video signal part;

a display for displaying a first video scene in accordance with the first video signal part; and means for holding the displayed first video scene on the display when the detecting means detects the flag portion.

17. A video playback system comprising:

means for receiving a video signal having a first video signal part followed by a second video signal part, the first and second video signal parts each including interframe (IR) and intraframe (IA) data;

means for detecting a flag portion in the received video signal, said flag portion indicating a beginning of the second part of the received video signal;

a memory;

a display for displaying a video scene; and control means for causing a first video scene in accordance with the first video signal part to be built up in the memory before the flag portion is detected by the detecting means, for causing a partial second video scene in accordance with the second video signal part to be built up in the memory when the flag portion is detected by the detecting means, for causing the first video scene to be displayed on the display while the second video scene is being built up, and for causing the second video scene to be displayed after the second video scene is built up.

18. A video system having a video source and a video receiver, the video source comprising:

means for receiving a first video signal including interframe (IR) and intraframe (IA) data;

means for receiving a second video signal including interframe (IR) and intraframe (IA) data;

means for transmitting a compressed video signal to the video receiver, the compressed video signal including the first and second video signals in succession; and means for inserting a header at the beginning of the portion of the compressed video signal that includes the second video signal, the header including a flag portion indicating a beginning of the second video signal.

19. A video system having a video source and a video receiver, the video source comprising:

tuner means for selecting successive ones of a plurality of video signals, each video signal including interframe (IR) and intraframe (IA) data;

means for transmitting a compressed video signal to the video receiver, the compressed signal including a first and second of the plurality of video signals; and means for inserting a header at the beginning of the transmitted compressed video signal, the header including a flag indicating that a beginning of the second video signal has occurred.

* * * * *